Patented Nov. 1, 1932

1,885,207

UNITED STATES PATENT OFFICE

GELSTON TYLER KING, OF BROOKLINE, MASSACHUSETTS

TENNIS COURT AND METHOD OF TREATING SAME

No Drawing.   Application filed April 17, 1930. Serial No. 445,222.

This invention relates to tennis courts, gravel walks, driveways, and similar paved surfaces.

Tennis courts of the so-called clay type usually are made simply by scraping the loam from the desired area and paving by applying a surfacing material which consists, in a typical instance, of clay mixed with varying proportions of fine gravel and sand. When tennis courts are built with greater care, a foundation is prepared to give suitable drainage, and a surfacing several inches in thickness is applied which may be of approximately the composition above mentioned. Clay is regarded as an essential element in the surfacing material in order to give a smooth, hard, playing surface, while a certain amount of sand preferably is mixed with it for the purpose of preventing caking and cracking of the surface which will occur if too high a percentage of clay is used, and also to make the court more permeable to surface water.

A tennis court of this character reflects the sun light to such a high degree that it produces a very disagreeable glare which a great many players find exceedingly trying to the eyes. The present invention is especially concerned with this condition and it aims to devise an economical and thoroughly practical method of obviating this objectionable feature of clay courts. The invention involves both a new method or process and also a novel product.

I have found that the surface characteristics of tennis courts of the clay type can be modified very substantially by the use of coloring compounds suspended in suitable oils. Inasmuch as the surface of a tennis court must be relatively dry or at least devoid of any stickiness, it is obviously impracticable to use oils of the character commonly used in paints. Furthermore, since clay is a good filtering medium it naturally tends to filter out the pigments, ochres or solids commonly used as colors in paints. I have found, however, that by using a relatively light non-drying oil, such as a mineral oil of approximately the consistency of kerosene, or more preferably a somewhat lighter oil, and suspending the coloring solids in it, a mixture is produced which will penetrate the surface layers of a tennis court for a considerable depth apparently without appreciable separation of the coloring solids from the oil.

I have produced entirely satisfactory results by grinding the green pigments or "color" in a light oil, such as one of those above mentioned, and then mixing the ground compound with a sufficient quantity of the oil to produce a thin penetrating mixture. Approximately two to two and one-half pounds of green color ground and mixed with a gallon of a light mineral oil, such as one of those above mentioned, gives satisfactory results.

Such a mixture may be sprayed on the surface of a tennis court with spray guns and will readily penetrate, the color being carried into the surface layers for a considerable depth. I consider it preferable to apply a sufficient quantity of this mixture to penetrate to a depth of approximately one inch and a penetration of at least one-half inch should be obtained in any event. A gallon of the mixture above mentioned will satisfactorily cover approximately a hundred square feet of surface. By carrying the penetration to a depth of approximately one inch the color of the surface is not disturbed by making the ordinary repairs on the court.

A court treated in this manner has a very pleasant green shade entirely devoid of the glare which is characteristic of the usual clay court. Other colors may, however, be used if desired. In addition this treatment is of advantage in preventing the growth of grass on the court, reducing the dust, and assisting the clay in binding together the fine powdery constituents of the court surface. At the same time it is devoid of any appreciable greasiness or tacky characteristics.

While the terms "clay type" and "tennis court" have been used throughout the specification and the appended claims, essentially the same treatment is useful also on gravel walks, driveways, and the like, and these clay type therefore, are regarded as the equivalents of a clay type tennis court, and such terms are to be construed as inclusive thereof.

While I have herein disclosed a typical formula, it will be understood that this disclosure has been made rather by way of explanation than limitation.

Having thus described my invention, what I desire to claim as new is:

1. That improvement in methods of modifying the surface characteristics of a clay type paved area which consists in spraying the surface of the area with a coloring compound suspended in a relatively light non-drying oil.

2. That improvement in methods of modifying the surface characteristics of a clay type paved area, which consists in introducing color suspended in a light non-drying mineral oil into the surface layers of the area for a substantial depth.

3. A clay type paved area having the surface layers thereof impregnated for a substantial depth with a mixture of a coloring compound and a relatively light non-drying oil.

4. A clay type paved area having the surface layers thereof impregnated for a substantial depth with a mixture of a green coloring compound and a light non-drying mineral oil.

GELSTON TYLER KING.

CERTIFICATE OF CORRECTION.

Patent No. 1,885,207. November 1, 1932.

GELSTON TYLER KING.

It is hereby certified that error appears in the printed specification of the above numbered patent requiring correction as follows: Page 1, lines 96, and 97, strike out the words "clay type"; and that the said Letters Patent should be read with this correction therein that the same may conform to the record of the case in the Patent Office.

Signed and sealed this 13th day of December A. D. 1932.

(Seal)

M. J. Moore,
Acting Commissioner of Patents.